United States Patent
Amrhein et al.

(10) Patent No.: US 10,320,896 B2
(45) Date of Patent: *Jun. 11, 2019

(54) INTELLIGENT MAPPING FOR AN ENTERPRISE GRID

(71) Applicant: International Business Machines Corporation, Armonk, NY (US)

(72) Inventors: Dustin K. Amrhein, Zachary, LA (US); Douglas C. Berg, Rochester, MN (US); Kulvir S. Bhogal, Fort Worth, TX (US); Nitin Gaur, Round Rock, TX (US); Christopher D. Johnson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,369

(22) Filed: Mar. 20, 2017

(65) Prior Publication Data

US 2017/0195409 A1     Jul. 6, 2017

Related U.S. Application Data

(63) Continuation of application No. 13/608,123, filed on Sep. 10, 2012, now Pat. No. 9,639,582.

(51) Int. Cl.
*H04L 29/08* (2006.01)
*H04L 12/743* (2013.01)
*G06F 16/2458* (2019.01)

(52) U.S. Cl.
CPC ...... *H04L 67/1021* (2013.01); *G06F 16/2471* (2019.01); *H04L 45/7453* (2013.01)

(58) Field of Classification Search
CPC ....................................................... H04L 67/34
USPC ........................................................ 709/217
See application file for complete search history.

(56) References Cited

U.S. PATENT DOCUMENTS

| | | | | |
|---|---|---|---|---|
| 6,853,982 B2* | 2/2005 | Smith | ................... | G06Q 30/02 705/26.7 |
| 8,438,560 B2* | 5/2013 | Govindarajan | ........... | G06F 8/61 717/168 |
| 2002/0010798 A1* | 1/2002 | Ben-Shaul | ........ | H04L 29/12066 709/247 |
| 2003/0195803 A1* | 10/2003 | Ketonen | ................ | G06Q 10/10 705/14.39 |
| 2008/0320151 A1* | 12/2008 | McCanne | ............... | H03M 7/30 709/228 |

(Continued)

OTHER PUBLICATIONS

List of IBM Patents or Patent Applications Treated as Related. Filed Mar. 20, 2017. 2 pages.

(Continued)

*Primary Examiner* — Kevin T Bates
*Assistant Examiner* — Emad Siddiqi
(74) *Attorney, Agent, or Firm* — Isaac J. Gooshaw (57) ABSTRACT

A computer receives a request from a client application for data within an enterprise grid. The computer sends the data along with a program to monitor the application's use of the data. The computer subsequently receives from the program a subset of the data being utilized by the client application. Responsive to a subsequent request for the data, the computer sends to the client application only the data corresponding to the identified subset of data being utilized.

17 Claims, 4 Drawing Sheets

(56) References Cited

U.S. PATENT DOCUMENTS

| | | | |
|---|---|---|---|
| 2010/0169392 A1* | 7/2010 | Lev Ran | G06F 9/546 |
| | | | 707/827 |
| 2012/0317563 A1* | 12/2012 | Arcese | G06F 11/1004 |
| | | | 717/170 |
| 2013/0054580 A1* | 2/2013 | Sewell | G06F 16/9027 |
| | | | 707/723 |
| 2013/0246498 A1* | 9/2013 | Zucknovich | H04L 67/2842 |
| | | | 709/201 |
| 2013/0332484 A1* | 12/2013 | Gajic | G06F 16/21 |
| | | | 707/770 |
| 2014/0074966 A1* | 3/2014 | Amrhein | H04L 67/1021 |
| | | | 709/217 |

OTHER PUBLICATIONS

Strong, "Enterprise Grid Computing" Queue—Enterprise Distributed Computing, vol. 3 Issue 6, Jul./Aug. 2005, pp. 50-59 [online], [retrieved on Apr. 9, 2012]. Retrieved from the Internet <URL: http://delivery.acm.org/10.1145/1090000/1080877/p50-strong.pdf?ip=129.33.1.37&acc=Open&CFID=153406393&CFTOKEN=33867339&_acm_=1347028741_dff20230d9d3c9fad14466f7996b5985>.

* cited by examiner

INTELLIGENT MAPPING FOR AN ENTERPRISE GRID

FIELD OF THE INVENTION

The present invention relates generally to the field of grid computing and more particularly to efficiently allowing clients to access data from an enterprise grid.

BACKGROUND OF THE INVENTION

"Grid computing" refers to the concept that applications and resources can be connected in the form of a pervasive network fabric or grid, with grids being viewed as very much analogous to electrical or power grids—accessible everywhere and sharable by everyone. In the general sense, a grid may be defined as a bounded environment (i.e., a collection of networked applications, services, resources, which is treated as a whole and within which grid computing is undertaken). The scope of a grid could range from a small departmental network to a vast collection of resources and services running in multiple locations, spread across the world, and owned by many organizational groups, government bodies, enterprises, or academic institutions.

When exploring the impact of grids within enterprise data centers, the term "enterprise grid" can be used to capture the notion of a grid that is managed by a single entity or business. This is a very specific type of grid, in which there is a clear scope of control and responsibility for managing the grid to meet a specific set of business goals. The extent of an enterprise grid is defined in terms of organizational responsibility and not in terms of geography or asset ownership. Thus, an enterprise grid may span multiple locations or data centers. It may also include applications or services run on behalf of other organizations, such as in an outsourced environment. Enterprise grids must also support various types of workload (transactional, OLTP, batch, compute-intensive, and legacy) and a large, heterogeneous set of resources. This contrasts markedly with more traditional aggregation frameworks in the data center, such as high-availability clusters, load-balanced clusters, or compute-intensive clusters, which are typically focused on a specific application, or type of application, and which are usually deployed on a relatively homogeneous set of resources.

SUMMARY

Embodiments of the present invention include a method, computer program product, and system for accessing data from an enterprise grid. A first computer system receives a request from a client application of a second computer system to access a dataset within an enterprise grid, the dataset having a plurality of values that each correspond to a separate field of the dataset. The first computer system determines that a previous request to access the dataset has not been received from the client application of the second computer system and, in response, gathers the plurality of values from within the enterprise grid and sends the plurality of values to the second computer system. The first computer system identifies a subset of the plurality of values utilized by the client application and the field for each value in the subset of the plurality of values utilized by the client application. The first computer system receives a subsequent request from the client application of the second computer system for the dataset. In response to receiving the subsequent request, the first computer system sends to the second computer system, of the plurality of values in the dataset, only values corresponding to each identified field.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro magnetic, optical, or any suitable combination thereof. A computer readable signal medium may be any computer readable medium that is not a computer readable storage medium and that can communicate, propagate, or transport a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
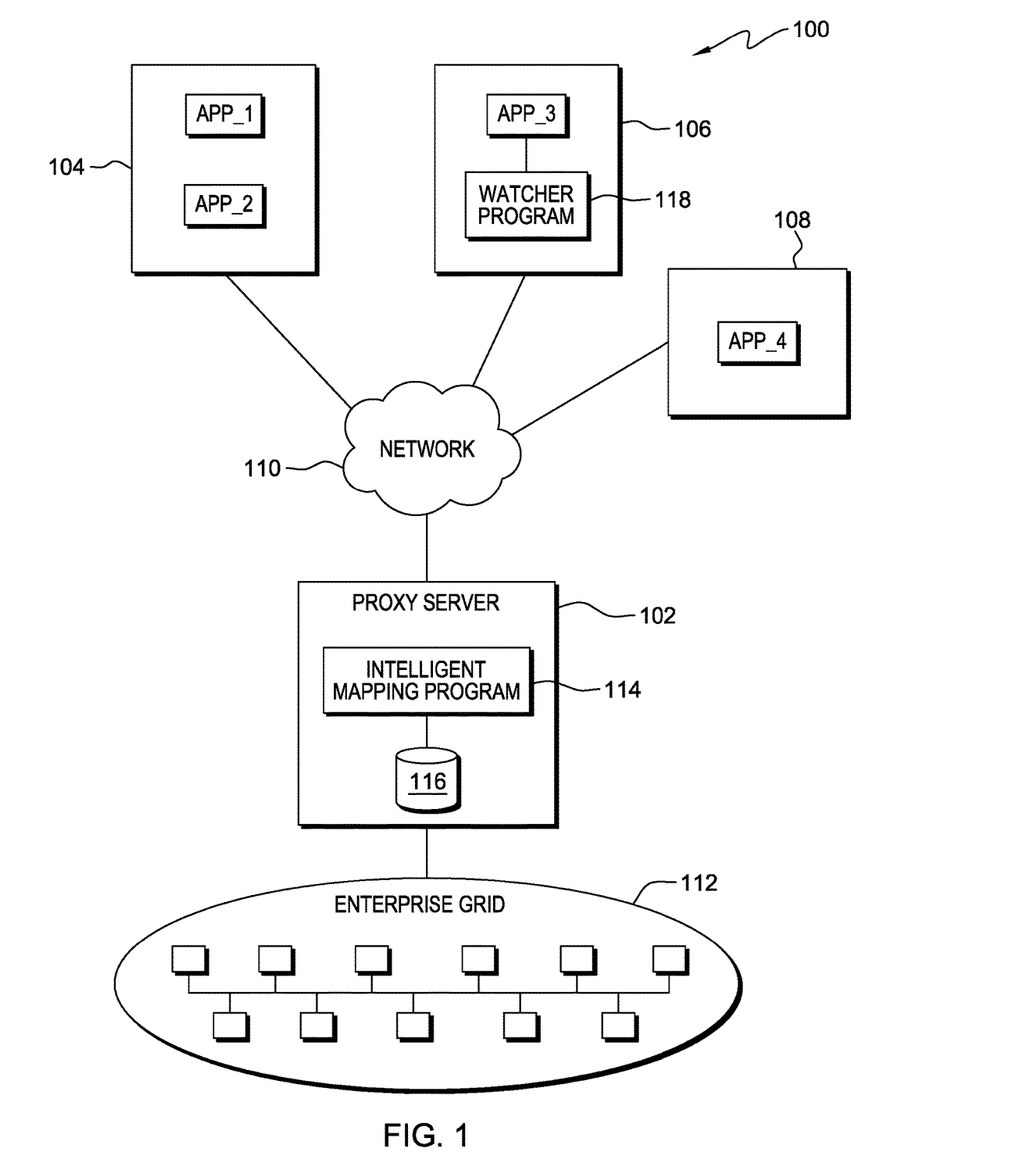
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Distributed data processing environment 100 includes proxy server computer 102 and client devices 104, 106, and 108, all interconnected over network 110. Proxy server computer 102 communicates with, and may be considered a part of, enterprise grid 112.

Enterprise grid 112 is a collection of resources including computing systems and components, which are interconnected through various connections and protocols and are at least nominally controlled by a single group or entity. The location of individual resources of enterprise grid 112 may be geographically diverse. Enterprise grid 112 may be utilized as a data grid, such as an in-memory data grid (IMDG), by enabling the storing of information in memory, and using redundancy—by keeping copies of that information synchronized across multiple servers—in order to ensure the resiliency of the system and the availability of the data in the event of a server failure. An IMDG provides a set of interconnected processes (typically Java®) that hold data in memory over multiple resources, enabling faster data access and reducing stress on the back-end (physical) databases. Data may be accessed in enterprise grid 112 through a key-value associative array or data structure where identifying values (keys) are mapped to associated values (e.g., using a hash table or hash map).

In the depicted environment, proxy server computer 102 acts as a conduit between enterprise grid 112 and client computers, such as client devices 104, 106, and 108. Proxy server computer 102 may receive queries from client computers, locate the required information from resources in enterprise grid 112 (for example, by computing a hash of a received key to determine the appropriate server), and sends values associated with the query back to the client computer. In various embodiments of the present invention, proxy server computer 102 can be a laptop computer, tablet computer, netbook computer, personal computer (PC), a desktop computer, a personal digital assistant (PDA), a smart phone, or any programmable electronic device capable of communicating with client devices 104, 106, and 108 via network 110 and with various components and devices within enterprise grid 112. Proxy server computer 102 includes intelligent mapping program 114 for filtering data to be returned to a requesting client application from enterprise grid 112. Proxy server computer 102 can store mapping tables and filtering preferences in computer storage 116.

Embodiments of the present invention recognize that due to different data requirements, data structures, and data object requirements of individual applications (developed and owned by different teams and units), accessing data from an enterprise grid is most commonly performed at a rudimentary level. That is, accessing via a strict database structure with universal fields is impractical due to the size of the enterprise grid and the diversity of client applications accessing the grid. Consequently, unlike accessing data via a database query, such as "select <data> from <location> where <conditions are true>", a rudimentary enterprise grid data access typically returns values without any way to limit them to a desired subset. For example, a client gives a key value to proxy server computer 102 and proxy server computer 102 returns all values associated with the key.

Still more specifically, consider an instance in which a client application requires a user's address. The application may only have local access to the mapping key, in this instance, the user's name. The application may query enterprise grid 112 using the user's name, and in return may receive all associated data including address, age, social security number, etc.

According to embodiments of the present invention, data is more selectively provided responsive to a client request. In one aspect, intelligent mapping program 114 registers the request and the requesting application, and monitors the client application's use of received values. Based on the client application's use, during subsequent requests for data, intelligent mapping program 114 filters the values to return only the information desired by the client application. In a preferred implementation, to monitor the client application's use of received values, intelligent mapping program 114 inserts watcher program 118 into the computer hosting the client application that requested the data.

Take, for example, the aforementioned application querying enterprise grid 112 using the user's name as a key and receiving all associated data including address, age, and social security number. After monitoring the application's use of received data, intelligent mapping program 114 identifies that the application only makes use of the user's address. In subsequent requests from the client application utilizing the same key (the user's name), intelligent mapping program 114 will only return the user's address to the application and not the age, social security number, or other unused data associated with the key.

In various embodiments of the present invention, client devices 104, 106, and 108 can each respectively be a laptop computer, tablet computer, netbook computer, personal computer (PC), a desktop computer, a personal digital assistant (PDA), a smart phone, or any programmable electronic device capable of communicating with proxy server computer 102 via network 110. Client device 104 includes two applications, app_1 and app_2, which execute locally on client device 104 and may request data from enterprise grid 112. Client device 106 includes one application, app_3, which executes locally on client device 106 and has the capability to request data from enterprise grid 112. Client device 106 also includes watcher program 118 (sent by proxy server computer 102) for monitoring the usage of data from enterprise grid 112 by app_3 and reporting any discerned patterns to proxy server computer 102. Client device 108 also includes an application, app_4, running locally on client device 108 and capable of requesting data from enterprise grid 112. Those of ordinary skill in the art will understand that client devices 104, 106, and 108 may in some instances be members of enterprise grid 112 acting as clients to the grid during the execution of a specific application.

Network 110 can be, for example, a local area network (LAN), a wide area network (WAN) such as the Internet, or a combination of the two, and can include wired, wireless, or fiber optic connections. In general, network 110 can be any combination of connections and protocols that will support communications between proxy server computer 102 and client devices 104, 106, and 108.

Figure 4:
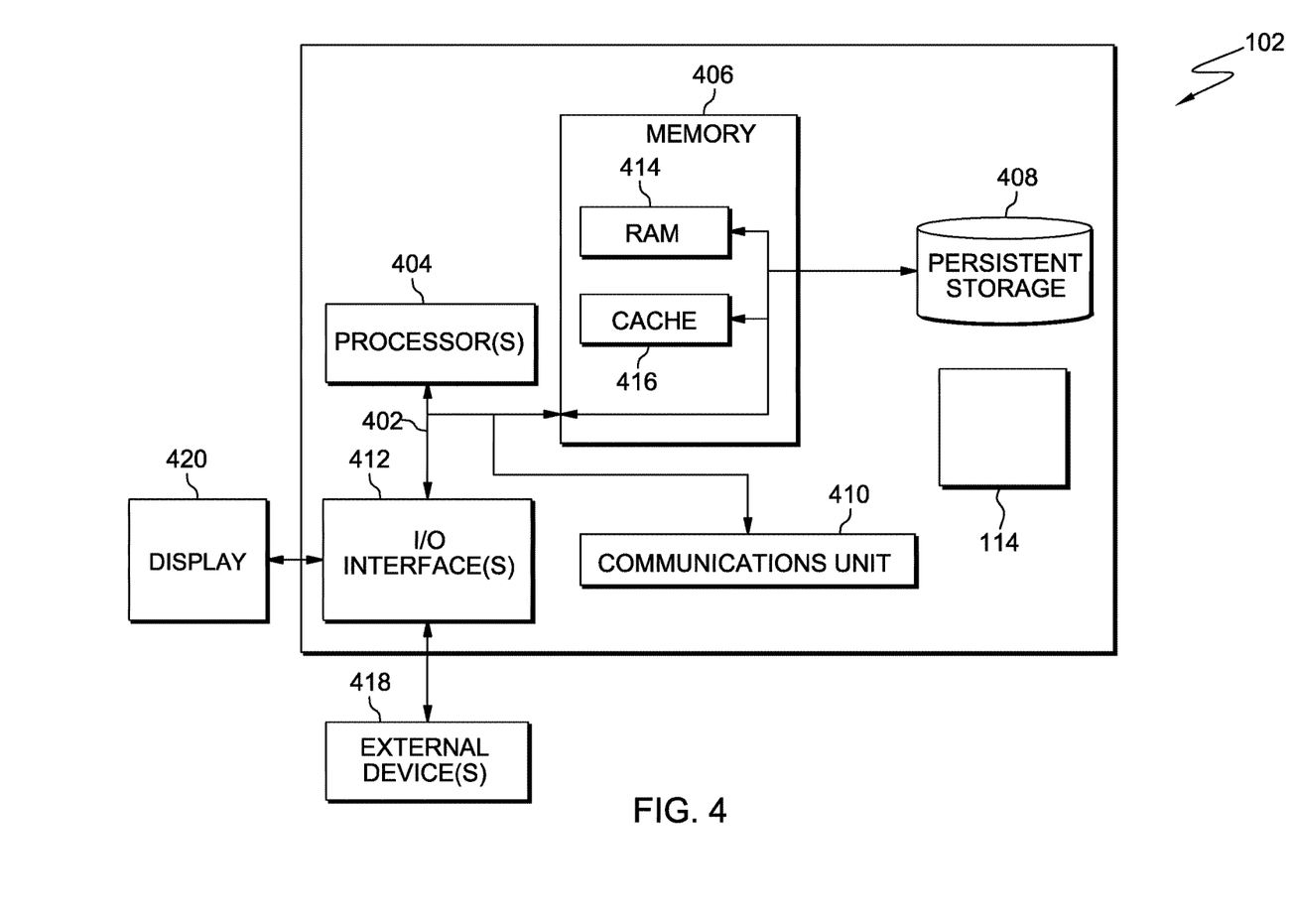
FIG. 4 depicts a block diagram of components of the proxy server computer executing the intelligent mapping program, in accordance with an embodiment of the present invention.

Proxy server computer 102 may include internal and external hardware components, as depicted and described in further detail with respect to FIG. 4.

Figure 2:
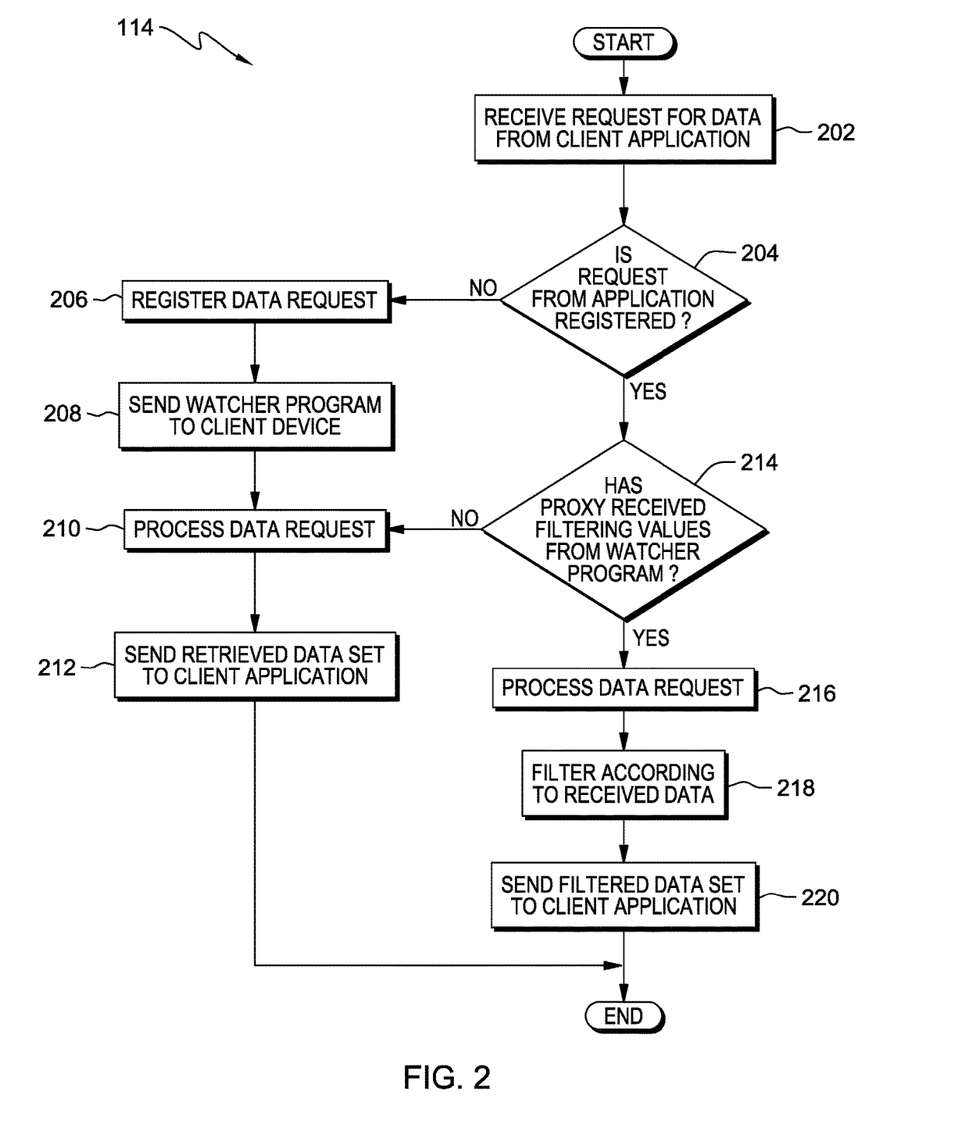
FIG. 2 is a flowchart depicting operational steps of an intelligent mapping program, on a proxy server computer within the data processing environment of FIG. 1, for filtering values returned to a client application, in accordance with an embodiment of the present invention.

FIG. 2 is a flowchart depicting operational steps of intelligent mapping program 114 for filtering values requested by a client application, in accordance with an embodiment of the present invention.

Intelligent mapping program 114 receives a request for data from a client application (202). The request preferably is a key value or has data corresponding to a key value in a mapping table. Intelligent mapping program 114 determines whether the request from the client application is registered (decision 204). The "registration" indicates that a specified client application has previously submitted a specific query/request. In one registration aspect, according to an embodiment, intelligent mapping program 114 stores and maintains a table containing specific client applications and keys previously submitted in requests by each respective client application. Further, for each key submitted by each client application, program 114 stores data (hereafter "filtering data") indicative of the values actually used by a client application subsequent to submitting the key, described herein below. When determining whether the request is registered, intelligent mapping program 114 may check this table to see if 1) the requesting client application is listed in the table and 2) the key submitted by the client application is listed in association with the client application in the table. A person of ordinary skill in the art will recognize that there are other ways in which such associations may be tracked.

If intelligent mapping program 114 determines that the request from the client application is not registered (no branch, decision 204), intelligent mapping program 114 registers the specific data request (206) in relation to the client application. In one implementation, registering the data request is accomplished by one or both adding the client application to the table of known/registered applications (if not already in the table) and adding the key from the data request to the table in association with the client application. (Intelligent mapping program 114 also sends watcher program 118 to the client device executing the client application (208). Watcher program 118 analyzes the client application's use of received data, i.e., determines which data the client application uses of the requested data that the client application receives. Watcher program 118 returns filtering data that indicates data each client application uses for each particular request, as described in more detail herein below.)

Intelligent mapping program 114 processes the request for data (step 210). To process the request, intelligent mapping program 114 identifies the key from the request. In one embodiment, the request for data consists solely of the key. In another embodiment, the request is received in a format such that intelligent mapping program 114 can quickly parse and locate the received key. Intelligent mapping program 114 computes a hash of the key. The hash identifies a server where information associated with the key is located. Upon determining which server has the information associated with the key, intelligent mapping program 114 sends the key to the server, which computes a second hash from the key to determine where to read the corresponding values. Upon reading those values, the server returns them to the intelligent mapping program 114 at proxy server computer 102. Intelligent mapping program 114 sends the retrieved dataset to the client application (212). In this instance, intelligent mapping program 114 sends the complete dataset (all values associated with the key) to the requesting client application, and the client application may utilize any of the received values.

Returning to decision 204, if intelligent mapping program 114 instead determines that the request is registered (yes branch, decision 204), intelligent mapping program 114 determines whether proxy server computer 102 has received filtering data, corresponding to the request, from watcher program 118 (decision 214). In one embodiment, after monitoring the client application for a predetermined period, watcher program 118 determines the values that the client application utilizes out of the received values (the values that are actually pertinent to the client application), and sends the determined values to intelligent mapping program 114 on proxy server computer 102. The determined values may be saved as filtering data in a table of known/registered client applications in association with applicable client application and key. Intelligent mapping program 114 can use this data to filter data returned in response to a subsequent request from the client application having the same key.

In an exemplary implementation, when the values are retrieved from enterprise grid 112, they are gathered as a list of values in a specific order. Each value returned is associated with a specific field. Though proxy server computer 102 may not have access to names of the field (e.g., "address field," "SSN," etc.) the order of a given value in the list of values is indicative of the field it belongs to. The filtering data stored by intelligent mapping program 114 indicates which fields the client application has used (which presumably indicates which fields the client application now desires in a current request) by indicating the placement of the desired values from the ordered list (e.g., the first value and the seventh value from the list of values received in response to given key, where the first and seventh value correspond to a desired address field and SSN field). At decision 214, intelligent mapping program 114 can determine if the request (or, more specifically, the key received) is associated with filtering data.

If the request is not associated with filtering data (no branch, decision 214), intelligent mapping program 114 can process the data request (210) and send the complete dataset to the client application (212) (under the assumption that watcher program 118 has not yet completed its analysis and returned to proxy server computer 102 the values determined to be utilized by the client application).

If intelligent mapping program 114 determines that filtering data is associated with the received request (yes branch, decision 214), intelligent mapping program 114 processes the data request (216) to retrieve the full dataset. Intelligent mapping program 114 then filters the full dataset according to the received filtering data (218), and sends the filtered dataset to the client application (220). Following the example stated above, only the first and seventh values in the dataset would be sent to the client application. In this manner, only the information that the client application will utilize is received by the client application. In an alternate embodiment, intelligent mapping program 114 may forward the filtering data to the appropriate server computer within enterprise grid 112 along with the request for the data, and the server computer locates the pertinent subset of values and returns only the relevant values to proxy server computer 102. This similarly allows intelligent mapping program 114 to send only the values that the client application will utilize, but also offloads some of the processing to the individual servers, avoiding potential bottle necks at proxy server computer 102.

Figure 3:
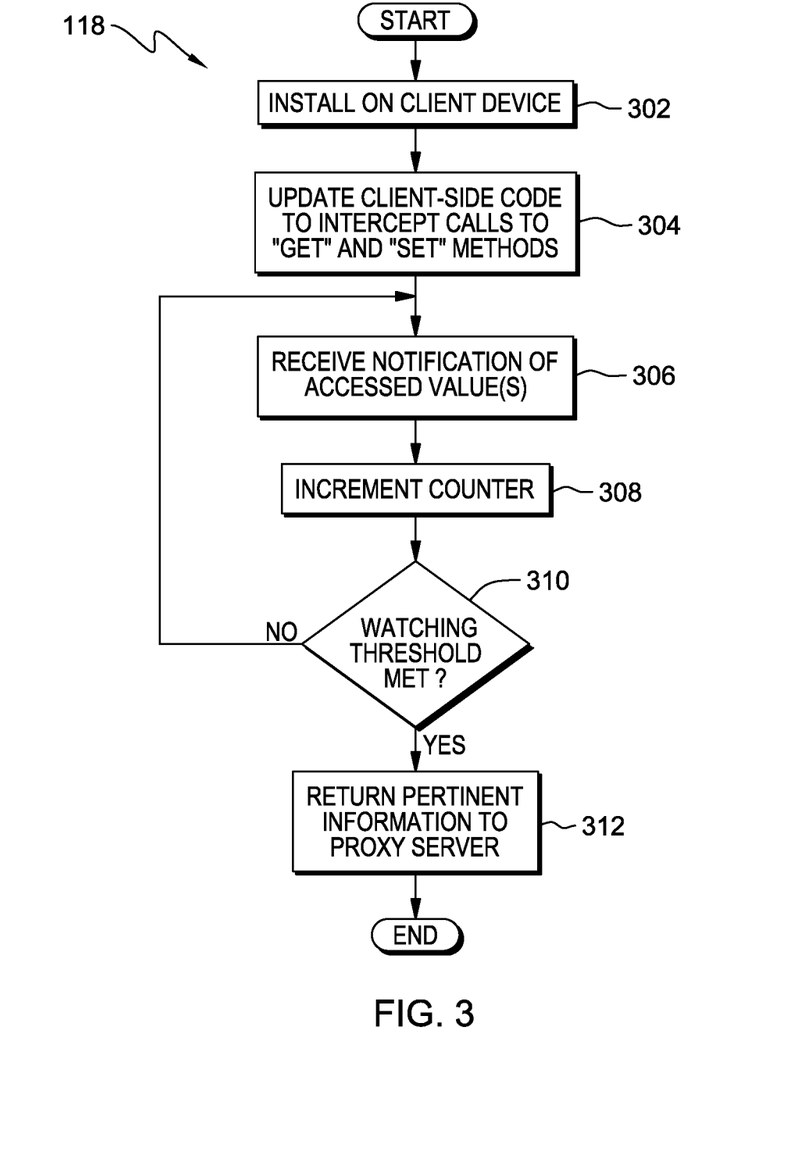
FIG. 3 illustrates operational steps of a watcher program, inserted on a client device within the data processing environment of FIG. 1, in accordance with an embodiment of the present invention.

FIG. 3 illustrates operational steps of watcher program 118, according to one embodiment of the present invention. In a preferred embodiment, once sent to a client device, watcher program 118 automatically installs itself on the client device (302). The client application that requested data from enterprise grid 112 may, in some embodiments, initiate and/or allow the installation. Watcher program 118 may be installed specifically to monitor the set of values sent by proxy server computer 102. Where an unregistered request has been received by proxy server computer 102 but an instance of watcher program 118 already exists on the client device (typically indicative of a different request/key being registered for the client application), the existing instance of watcher program 118 may instead receive from proxy server computer 102 the new set of values to be monitored in addition to, or instead of, a different set of values monitored by watcher program 118.

Once installed, watcher program 118 monitors the client application to determine which of the values returned by the enterprise grid in response to the data request are being utilized. More specifically, watcher program 118 may run a process to update the client-side code to be able to intercept calls to getting and setting methods (step 304). For example, in Java®, the java persistence API (JPA) has the capability to run an enhancement program that would allow an insertion into compiled program code. JPA also has the ability to update program code in the runtime. Alternatively, the client application may be programmed with a surface API that can be used to tie into the framework. The inserted code may detect a call to a get or set method for a specified data field or value, and notify watcher program 118. Watcher program 118 receives the notification of the accessed value (step 306), and in response, watcher program 118 may increment a counter specific to the value (step 308).

Watching program 118 determines if a watching threshold has been met (decision 310). The watching threshold dictates how long the monitoring process should continue before sending acquired data back to proxy server computer 102. For example, the watching threshold could be a specified duration of time, a specified number of intercepted calls, or even a specific count achieved for a given value.

If the watching threshold has been met (yes branch, decision 310), watching program 118 returns pertinent information to proxy server computer 102 (step 312). In one embodiment, watching program 118 may return only values that have been accessed a specified number of times. In another embodiment, watching program 118 may return only the values that have been accessed the highest percentage of times. In yet another embodiment, watcher program 118 may return all values which have been accessed without regard to the amount of times the values have been accesses. These returned values may be subsequently used by intelligent mapping program 114 to filter subsequent queries or to identify fields to filter in subsequent queries.

A person of ordinary skill in the art will recognize that after sending the values to proxy server computer 102, watcher program 118 can continue to monitor usage of values, or intermittently monitor usage of values, and update proxy server computer 102 if any changes in the values utilized by the client application are detected.

FIG. 4 depicts a block diagram of components of proxy server computer 102 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Proxy server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Intelligent mapping program 114 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of enterprise grid 112 and client devices 104, 106, and 108. In these examples, communications unit 410 includes one or more network interface cards. Communications unit 410 may provide communications through the use of either or both physical and wireless communications links. Intelligent mapping program 114 may be downloaded to persistent storage 408 through communications unit 410.

I/O interface(s) 412 allows for input and output of data with other devices that may be connected to proxy server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., intelligent mapping program 114, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for reducing database stress by processing data access requests using a collection of interconnected computing resources that are distributed across multiple computing systems, the method comprising:

identifying, by one or more processors, a client application that submitted a first request for access to a dataset that includes a set of values, the first request including a value key that identifies a type of the first request;

returning, by the one or more processors, a response for the first request that includes the dataset;

monitoring, by the one or more processors, a use of the values by the client application;

generating, by the one or more processors, a mapping table containing associations between client applications and value keys that were previously submitted in requests by each respective client application;

based on which fields in the dataset were accessed by a client program, determining, by the one or more processors, for the set of values both of (i) a first sub-set of values that were used by the client application for completion of a task by the client program and (ii) a second sub-set of values that were not used by the client application for completion of the task;

responsive to identifying the value key in a second request for access to the set of values included in the dataset, parsing, by the one or more processors, the set of values into the first sub-set of values and the second sub-set of values;

generating, by the one or more processors, a response for the second request that (i) includes the first sub-set of values and (ii) excludes the second sub-set of values; and sending, by the one or more processors, the response for the second request to the client application.

2. The computer-implemented method of claim 1, further comprising:

for each value key submitted by each client application, associating, by the one or more processors, an indication of a given type of value used by a given client application to process a given task.

3. The computer-implemented method of claim 1, further comprising:

determining, by the one or more processors, whether the first request from the client application is a registered request based on (i) the client application being listed in the mapping table and (ii) the value key submitted by the client application being listed in association with the client application in the mapping table, wherein registration indicates that a specified client application has previously submitted a specific request that included a given value key.

4. The computer-implemented method of claim 3, further comprising:

responsive to a determination that a specific request from the client application is not registered, registering, by the one or more processors, the specific request by adding one or both of (i) an identity of the client application to the mapping table and (ii) the value key from the specific request to the mapping table to forming an association between the specific request and the client application.

5. The computer-implemented method of claim 1, further comprising:
responsive to receiving the second request, computing, by the one or more processors, a first hash of the value key, wherein the first hash identifies a server;
based on the first hash, generating, by the one or more processors, a second hash from the value key; and
accessing, by the one or more processors, one or more corresponding values on the server that are associated with the second hash; and
including, by the one or more processors, the one or more corresponding values as part of the dataset.

6. The computer-implemented method of claim 1, further comprising:
determining, by the one or more processors, one or more organization relationships between a given field and other fields included in the dataset, wherein the given field is included in the first sub-set of values based, in part, on the one or more organization relationships;
determining, by the one or more processors, a type of value for the given field; and
generating, by the one or more processors, a filtering criteria that identifies values of the type in the dataset based, at least in part, on one or both of (i) the organizational relationships, and (ii) an pattern of access for the given field, wherein the pattern of access is determined based, in part, on one or more of (a) a period of time elapsing, (b) a number of requests being received, and (c) a periodic verification of which fields are being accessed by the client application to complete the task.

7. A computer program product for reducing database stress by processing data access requests using a collection of interconnected computing resources that are distributed across multiple computing systems, the computer program product comprising:
one or more computer-readable storage media having computer-readable program code embodied therewith, the computer-readable program code comprising:
program instructions to identify a client application that submitted a first request for access to a dataset that includes a set of values, the first request including a value key that identifies a type of the first request;
program instructions to return a response for the first request that includes the dataset;
program instructions to monitor a use of the values by the client application;
program instructions to generate a mapping table containing associations between client applications and value keys that were previously submitted in requests by each respective client application;
program instructions to, based on which fields in the dataset were accessed by a client program, determine for the set of values both of (i) a first sub-set of values that were used by the client application for completion of a task by the client program and (ii) a second sub-set of values that were not used by the client application for completion of the task;
program instructions to respond to an identification of the value key in a second request for access to the set of values included in the dataset, by parsing the set of values into the first sub-set of values and the second sub-set of values;
program instructions to generate a response for the second request that (i) includes the first sub-set of values and (ii) excludes the second sub-set of values; and
program instructions to send the response for the second request to the client application.

8. The computer program product of claim 7, further comprising:
program instructions to, for each value key submitted by each client application, associate an indication of a given type of value used by a given client application to process a given task.

9. The computer program product of claim 7, further comprising:
program instructions to determine whether the first request from the client application is a registered request based on (i) the client application being listed in the mapping table and (ii) the value key submitted by the client application being listed in association with the client application in the mapping table, wherein registration indicates that a specified client application has previously submitted a specific request that included a given value key.

10. The computer program product of claim 9, further comprising:
program instructions to respond to a determination that a specific request from the client application is not registered, by registering the specific request by adding one or both of (i) an identity of the client application to the mapping table and (ii) the value key from the specific request to the mapping table to forming an association between the specific request and the client application.

11. The computer program product of claim 7, further comprising:
program instructions to respond to receiving the second request, by computing a first hash of the value key, wherein the first hash identifies a server;
program instructions to, based on the first hash, generate a second hash from the value key; and
program instructions to access one or more corresponding values on the server that are associated with the second hash; and
program instructions to include the one or more corresponding values as part of the dataset.

12. The computer program product of claim 7, further comprising:
program instructions to determine one or more organization relationships between a given field and other fields included in the dataset, wherein the given field is included in the first sub-set of values based, in part, on the one or more organization relationships;
program instructions to determine a type of value for the given field; and program instructions to generate a filtering criteria that identifies values of the type in the dataset based, at least in part, on one or both of (i) the organizational relationships, and (ii) an pattern of access for the given field, wherein the pattern of access is determined based, in part, on one or more of (a) a period of time elapsing, (b) a number of requests being received, and (c) a periodic verification of which fields are being accessed by the client application to complete the task.

13. A computer system for reducing database stress by processing data access requests using a collection of interconnected computing resources that are distributed across multiple computing systems, the computer system comprising:
- one or more processors;
- one or more computer-readable storage media; and
- program instructions stored on the one or more computer-readable storage media for execution by at least one of the one or more processors;
- the program instructions comprising:
  - program instructions to identify a client application that submitted a first request for access to a dataset that includes a set of values, the first request including a value key that identifies a type of the first request;
  - program instructions to return a response for the first request that includes the dataset;
  - program instructions to monitor a use of the values by the client application;
  - program instructions to generate a mapping table containing associations between client applications and value keys that were previously submitted in requests by each respective client application;
  - program instructions to, based on which fields in the dataset were accessed by a client program, determine for the set of values both of (i) a first sub-set of values that were used by the client application for completion of a task by the client program and (ii) a second sub-set of values that were not used by the client application for completion of the task;
  - program instructions to respond to an identification of the value key in a second request for access to the set of values included in the dataset, by parsing the set of values into the first sub-set of values and the second sub-set of values;
  - program instructions to generate a response for the second request that (i) includes the first sub-set of values and (ii) excludes the second sub-set of values; and
  - program instructions to send the response for the second request to the client application.

14. The computer system of claim 13, further comprising:
program instructions to, for each value key submitted by each client application, associate an indication of a given type of value used by a given client application to process a given task.

15. The computer system of claim 13, further comprising:
program instructions to determine whether the first request from the client application is a registered request based on (i) the client application being listed in the mapping table and (ii) the value key submitted by the client application being listed in association with the client application in the mapping table, wherein registration indicates that a specified client application has previously submitted a specific request that included a given value key.

16. The computer system of claim 13, further comprising:
program instructions to respond to a determination that a specific request from the client application is not registered, by registering the specific request by adding one or both of (i) an identity of the client application to the mapping table and (ii) the value key from the specific request to the mapping table to forming an association between the specific request and the client application.

17. The computer system of claim 13, further comprising:
program instructions to respond to receiving the second request, by computing a first hash of the value key, wherein the first hash identifies a server;
program instructions to, based on the first hash, generate a second hash from the value key; and
program instructions to access one or more corresponding values on the server that are associated with the second hash; and
program instructions to include the one or more corresponding values as part of the dataset.

* * * * *